US 11,781,082 B2

(12) United States Patent
Schmidt et al.

(10) Patent No.: US 11,781,082 B2
(45) Date of Patent: Oct. 10, 2023

(54) PROCESS AND PLANT FOR REMOVING THIOLS FROM SYNTHESIS GAS

(71) Applicant: L'Air Liquide, Société Anonyme pour l'Etude et l'Exploitation des Procédés Georges Claude, Paris (FR)

(72) Inventors: Sophia Schmidt, Frankfurt am Main (DE); Matthias Linicus, Eppstein (DE); Hincal Leichner, Hochheim (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 119 days.

(21) Appl. No.: 17/545,090

(22) Filed: Dec. 8, 2021

(65) Prior Publication Data
US 2022/0177793 A1    Jun. 9, 2022

(30) Foreign Application Priority Data
Dec. 8, 2020    (EP) .................................... 20020594

(51) Int. Cl.
*B01D 53/00*    (2006.01)
*C10L 3/10*    (2006.01)
*B01D 53/14*    (2006.01)

(52) U.S. Cl.
CPC ............ *C10L 3/103* (2013.01); *B01D 53/002* (2013.01); *B01D 53/1406* (2013.01); *B01D 53/1418* (2013.01); *B01D 53/1425* (2013.01); *B01D 53/1468* (2013.01); *B01D 53/1475* (2013.01); *B01D 53/1487* (2013.01); *B01D 53/1493* (2013.01); *C10L 3/104* (2013.01);
(Continued)

(58) Field of Classification Search
CPC ............ B01D 53/00; B01D 53/14; C10L 3/10
See application file for complete search history.

(56) References Cited

U.S. PATENT DOCUMENTS

| | | | | |
|---|---|---|---|---|
| 4,609,389 A | * | 9/1986 | Karwat ................. | B01D 53/14 62/635 |
| 2010/0319540 A1 | * | 12/2010 | Garcia Andarcia ....... | C10L 3/10 95/180 |

(Continued)

FOREIGN PATENT DOCUMENTS

| | | |
|---|---|---|
| DE | 196 10 846 | 9/1997 |
| EP | 3 539 641 | 9/2019 |

(Continued)

OTHER PUBLICATIONS

Ullmann's Encyclopedia of Industrial Chemistry, Physical absorption processes, 6th ed. vol. 15, 399-407.

(Continued)

*Primary Examiner* — Sharon Pregler
(74) *Attorney, Agent, or Firm* — Elwood L. Haynes

(57) ABSTRACT

The invention relates to a process and a plant for removing thiols from synthesis gas. Thiols and optionally thiophene and carbon disulfide are absorbed in a dedicated absorption stage with methanol as physical absorption medium. Methanol laden with at least thiols is freed of thiols in a stripping stage with methanol vapours as stripping gas and the methanol vapours-containing thiols are freed of methanol in a scrubbing stage. The process according to the invention minimizes methanol losses and the amounts of coolant required for the process.

20 Claims, 1 Drawing Sheet

(52) U.S. Cl.
CPC .................. *B01D 2252/103* (2013.01); *B01D 2252/2021* (2013.01); *B01D 2256/16* (2013.01); *B01D 2256/20* (2013.01); *B01D 2257/304* (2013.01); *B01D 2257/306* (2013.01); *B01D 2257/308* (2013.01); *B01D 2257/408* (2013.01); *B01D 2257/504* (2013.01); *B01D 2259/124* (2013.01); *C10L 2290/12* (2013.01); *C10L 2290/541* (2013.01); *C10L 2290/545* (2013.01)

(56) References Cited

U.S. PATENT DOCUMENTS

| | | |
|---|---|---|
| 2020/0070087 A1 | 3/2020 | Corbet et al. |
| 2020/0078723 A1 | 3/2020 | Corbet et al. |
| 2021/0008490 A1 | 1/2021 | Gubrinski et al. |
| 2021/0323819 A1* | 10/2021 | Corbet .................. B01D 53/18 |

FOREIGN PATENT DOCUMENTS

| | | |
|---|---|---|
| EP | 3 616 775 | 3/2020 |
| EP | 3 620 224 | 3/2020 |
| EP | 3 666 365 | 6/2020 |

OTHER PUBLICATIONS

European Search Report for corresponding EP 20020594.6, dated May 11, 2021.

* cited by examiner

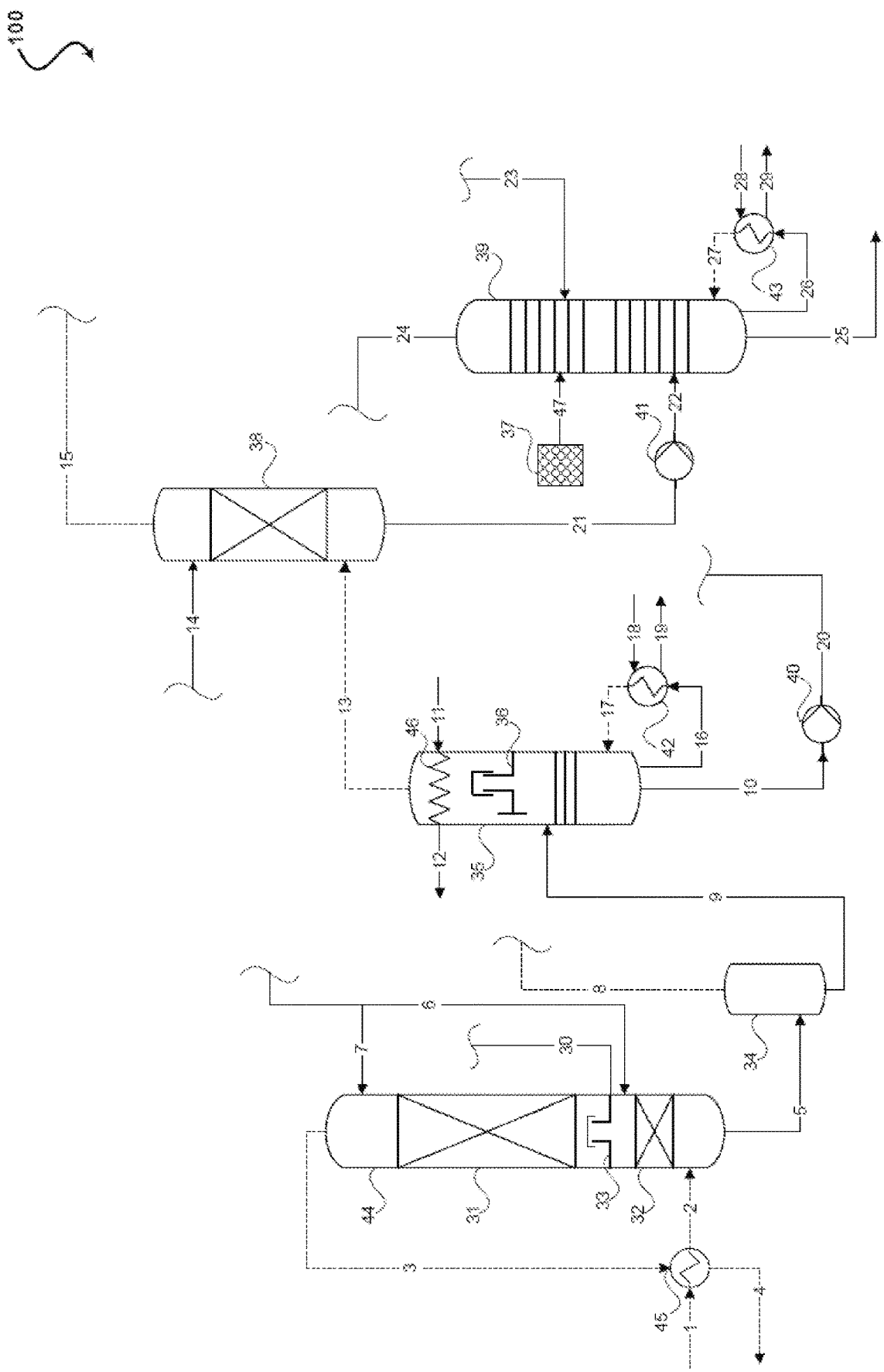

PROCESS AND PLANT FOR REMOVING THIOLS FROM SYNTHESIS GAS

CROSS REFERENCE TO RELATED APPLICATIONS

This application claims priority to EP 20020594.6, filed Dec. 8, 2020, the entire contents of which are incorporated herein by reference.

BACKGROUND

Field of the Invention

The present invention relates to a process and a plant for removing thiols from synthesis gas in a gas scrubbing process with methanol as a physical absorption medium.

Prior Art

Processes for removal of undesired concomitants from industrial synthesis gases by physical absorption are known from the prior art. Thus such processes may be used to remove, down to trace amounts, unwanted constituents of synthesis gases produced by gasification or reforming of carbon-containing feedstocks, for example carbon dioxide ($CO_2$), hydrogen sulfide ($H_2S$) and carbonyl sulfide (COS) from the desired synthesis gas constituents such as hydrogen ($H_2$) and carbon monoxide (CO).

These processes also referred to as gas scrubs utilize the properties of liquids to absorb gaseous substances and to keep them in solution in physically or chemically bound form. The efficiency with which a gas is absorbed by a liquid is expressed by the absorption coefficient. The better the absorption or dissolution of the gas in the liquid, the greater the absorption coefficient. The absorption coefficient generally increases with decreasing temperature and, in accordance with Henry's law, with increasing pressure. The liquids used in gas scrubbing are also generally referred to as absorption media.

Subsequently to the gas scrubbing, components scrubbed out of the synthesis gas in the gas scrubbing are removed from the laden absorption medium to obtain a regenerated or at least partially regenerated absorption medium. Known processes for regenerating the absorption medium are decompression (flashing), decompression with stripping gas (stripping) and decompression with stripping gas wherein for example the intrinsic vapour of the absorption medium is used as the stripping gas. The latter process is often also referred to as hot regeneration. In order to be usable for renewed absorption of gas components from the raw synthesis gas the absorption medium is typically subjected to a hot regeneration in the last regeneration stage. The hot regeneration recovers a virtually pure absorption medium which is suitable for the renewed absorption of undesired gas constituents from the raw synthesis gas.

An important process for the purification of raw synthesis gases is methanol scrubbing, also known as the Rectisol process, as described for example in Ullmann's Encyclopedia of Industrial Chemistry, 6th Ed. Vol. 15, p. 399 et seq. The Rectisol process utilizes the fact that the absorption coefficients of $H_2S$, COS and $CO_2$ in liquid cryogenic methanol differ by several orders of magnitude from those of $H_2$ and CO. After the scrubbing operation the methanol is regenerated and recycled into the process.

In addition to the aforementioned sulfur-containing components industrially produced (raw) synthesis gas often contains at least trace concentrations of other sulfur-containing substances such as lower alkyl thiols (hereinafter generally referred to as "thiols") and carbon disulfide ($CS_2$). Another undesirable, non-sulfurous but toxic concomitant is hydrogen cyanide (HCN). This generally makes the regeneration of the methanol more difficult, since thiols, $CS_2$ and HCN are strongly physically bonded to the methanol due to their high absorption coefficient. However, these substances should not be left behind in the methanol. HCN has a highly corrosive effect on plant components and is toxic. Thiols and $CS_2$ cannot be tolerated in the purified synthesis gas even in the smallest of quantities since they cause problems for downstream synthesis processes due to their sulfur content, for example due to the effect of sulfur as a catalyst poison.

In a particular embodiment of the Rectisol process the high absorption coefficients of thiols, $CS_2$ and HCN are utilized in that these are scrubbed out of the synthesis gas using a relatively small amount of methanol in the context of a dedicated absorption stage. This dedicated absorption stage is often referred to as "prescrubbing". Further absorption stages typically include the more or less selective, i.e. separate, removal of acid gases such as $H_2S$, COS and $CO_2$ in a plurality of further absorption stages. One or more absorption stages may be arranged within an absorption column.

The thiols- and HCN-laden methanol obtained in the context of the prescrubbing is according to EP 3 666 365 freed of value gases such as CO und $H_2$ in a plurality of serially arranged flash stages and subsequently after a further pressure reduction sent to a stripping column dedicated to the prescrubbing methanol which utilizes methanol vapour as stripping medium. The thiols and HCN exit the stripping column not in pure form but rather with significant amounts of methanol vapour. The methanol therefore requires subsequent costly and inconvenient condensation via a coolant and separator before the thiols may be sent to a Claus process sulfur recovery plant for example. Despite the ample use of cooling media and heat exchangers this process is often afflicted with methanol losses. HCN must be reabsorbed and otherwise discharged from the process in order that it is not supplied to the sulfur recovery and does not accumulate in the circuit of the gas scrubbing.

SUMMARY

It is a general object of the present invention to overcome the abovementioned disadvantages of the prior art.

It is especially an object of the present invention to minimize methanol losses in the context of the removal of thiols in a Rectisol-type gas scrubbing process.

It is a further object of the present invention to minimize coolant usage having regard to methanol condensation.

In a secondary aspect it is a further object of the present invention to remove hydrogen cyanide (HCN) from the circuit of the gas scrubbing process and dispose of it in non-toxic form.

The independent claims make a contribution to the at least partial achievement of at least one of the above objects. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention.

The terms "having", "comprising" or "containing", etc., do not preclude the possible presence of further elements, ingredients, etc. The indefinite article "a" does not preclude the possible presence of a plurality.

The objects of the invention are at least partially achieved by a process for removing thiols from synthesis gas in a gas scrubbing process with methanol as physical absorption medium, characterized by the following process steps:
(a) removing thiols from synthesis gas in an absorption stage configured for the removal of thiols by physical absorption of the thiols in methanol, wherein the absorption stage affords methanol laden with thiols and further co-absorbed gas components;
(b) treating the laden methanol obtained according to step (a) in a stripping stage with methanol vapour as stripping gas to obtain a thiols- and methanol-comprising gaseous mixture and liquid methanol laden with co-absorbed gas components;
(c) withdrawing the liquid methanol laden with co-absorbed gas components from the stripping stage according to step (b);
(d) withdrawing the thiols- and methanol-comprising gaseous mixture from the stripping stage according to step (b);
(e) removing methanol from the gaseous mixture withdrawn according to step (d) in a scrubbing stage by scrubbing with water to obtain a methanol- and water-comprising liquid mixture and gaseous thiols at least partially freed of methanol;
(f) withdrawing the gaseous thiols at least partially freed of methanol from the scrubbing stage according to step (e);
(g) withdrawing the methanol- and water-comprising liquid mixture from the scrubbing stage according to step (e).

Thiols and other sulfur compounds could be removed from the laden methanol, i.e. desorbed, effectively and at least in some cases selectively by stripping with methanol vapour as stripping gas. The thiols exit the stripping stage as gas not in pure form but rather always also contain a not inconsiderable amount of methanol vapour, i.e. stripping medium. In processes known from the prior art this methanol vapour is condensed as completely as possible to largely avoid methanol losses, thus entailing great coolant cost and complexity due to the high volatility of methanol.

The process according to the invention is characterized in that the gaseous mixture containing methanol and thiols is scrubbed with water. This forms a liquid methanol-water phase and a gaseous thiol phase depleted in methanol. It has surprisingly been found that, despite the relatively polar character of the thiol group, the thiols are practically not dissolved in water. Instead, the scrubbing water selectively dissolves the methanol vapours, wherein the thiols are obtained practically as a gaseous phase in pure form as a result of the scrubbing process.

Depending on the chosen conditions (pressure, temperature etc.) the thiols may likewise contain relatively small amounts of other gas components such as $CO_2$, $H_2S$ and COS. However, the majority of the abovementioned components remains absorbed in the laden methanol during the stripping stage and is removed from this laden methanol preferably in a hot regeneration stage.

In one embodiment step (e) affords gaseous thiols substantially freed of methanol. In a further embodiment step (e) affords gaseous thiols completely freed of methanol.

In one embodiment the process selectively removes from synthesis gas not only the thiols but also carbon disulfide ($CS_2$) and thiophene (empirical formula $C_4H_4S$). These compounds have similarly high absorption coefficients for methanol.

The absorption of the thiol by methanol according to step (a) is effected at elevated pressure. The absorption step (a) is in particular performed at an absolute pressure of 10 to 100 bar, preferably at 20 to 60 bar. The absorption of the thiols by methanol according to step (a) is further effected at cryogenic temperatures, in particular at temperatures of less than −30° C. Suitable conditions for absorption of sulfur compounds and carbon dioxide and further impurities present in synthesis gas are known to those skilled in the art and may be found in the relevant technical literature.

Synthesis gas may be obtained by processes known to those skilled in the art such as coal gasification, gasification of communal wastes (refuse gasification), biomass gasification and steam reforming (SMR), dry reforming (DryRef), gas-heated reforming (GHR), partial oxidation (POx), autothermal reforming (ATR), and combinations of these processes. For the present invention the first-mentioned gasification processes are of exceptional importance since these generally employ feedstocks having a high sulfur content. Synthesis gas contains hydrogen ($H_2$) and carbon monoxide (CO) as desired components, also known as value gases. Synthesis gas also contains undesired components such as for example carbon dioxide ($CO_2$), hydrogen sulfide ($H_2S$), carbonyl sulfide (COS), thiols (RSH), carbon disulfide ($CS_2$), thiophene ($C_4H_4S$), hydrogen cyanide (HCN), methane ($CH_4$) and nitrogen ($N_2$). The type and concentration of the impurities depends on the type of feedstock and process used for synthesis gas production.

Thiols present as impurities are mainly lower alkanethiols such as methanethiol, ethanethiol, propanethiol and butanethiol.

Most of the abovementioned impurities may be removed completely or at least down to trace levels by an appropriately designed gas scrubbing process with methanol as a physical absorption medium. In methanol as a physical absorption medium the solubility of the absorbed gases in methanol is brought about by physical interactions. In particular the absorption is not caused by chemical interactions, for example an acid-base interaction.

One embodiment of the method according to the invention is characterized in that the gaseous mixture obtained according to step (b) is cooled to partially condense the methanol present in the mixture and the condensed methanol is supplied to the stripping stage to produce methanol vapour for use as stripping gas.

This measure minimizes the amount of water required for the scrubbing stage according to (e). The condensed methanol may moreover be directly employed in the stripping stage to produce the stripping gas (methanol vapour). The stripping gas is produced for example via a reboiler integrated into a stripping column. The cooler required for cooling the mixture obtained according to step (b) may advantageously be directly integrated into the stripping column, in particular integrated into the top of the stripping column. The methanol condensed by the cooling then runs downwards into the bottom of the stripping column where the reboiler produces methanol vapour.

One embodiment of the process according to the invention is characterized in that the methanol- and water-comprising liquid mixture withdrawn according to step (g) is subjected to a thermal separation process for separation of methanol and water.

Gas scrubbing processes using methanol as absorption medium typically comprise an apparatus for thermal separation of water and methanol since water entrained via synthesis gas which has not been completely removed by condensation in an upstream step accumulates in the methanol circuit over longer periods. Such an apparatus is typically a rectification column. The apparatus may advantageously also be utilized for separating the methanol-water mixture withdrawn from the scrubbing stage according to step (g) into methanol and water.

One embodiment of the process according to the invention is characterized in that the thiols withdrawn from the scrubbing stage according to step (f) and at least partially freed of methanol are sent to a process for sulfur recovery.

The thiols withdrawn from the scrubbing stage according to step (f) are generally substantially completely or completely free of methanol. It is therefore advantageously possible to send the thiols freed of methanol directly to a process for sulfur recovery, for example a plant which produces sulfur by the Claus process.

One embodiment of the process according to the invention is characterized in that the methanol withdrawn from the stripping stage according to step (c) is sent to a hot regeneration stage for removal of the co-absorbed gas components.

The methanol withdrawn from the stripping stage according to step (c) contains gas components co-absorbed in the absorption stage according to step (a) such as carbon dioxide ($CO_2$), hydrogen sulfide ($H_2S$), carbonyl sulfide (COS) and hydrogen cyanide (HCN). These are removed in a hot regeneration stage. The hot regeneration stage likewise operates according to the principle that methanol vapour may be used as stripping gas for removing the abovementioned components. It moreover comprises in the top region a system of several coolers and separators to condense methanol vapor which exits the top region of the hot regeneration column together with the stripped-out gas components.

One embodiment of the process according to the invention is characterized in that the co-absorbed gas components comprise one or more elements selected from the group of hydrogen cyanide (HCN), hydrogen sulfide ($H_2S$), carbonyl sulfide (COS) and carbon dioxide ($CO_2$).

One embodiment of the method according to the invention is characterized in that the methanol- and water-comprising mixture withdrawn from the scrubbing stage according to step (g) comprises hydrogen cyanide (HCN) and/or that the liquid methanol laden with co-absorbed gas components withdrawn from step (c) comprises hydrogen cyanide (HCN) and wherein the hydrogen cyanide is converted into a cyanide salt by addition of a base.

On account of its toxic properties hydrogen cyanide poses a problem even in very low concentrations, especially when the substance accumulates in the methanol circuit of the gas scrubbing process over longer periods. It is therefore important to ensure that hydrogen cyanide is removed from the circuit completely and residuelessly and sent for proper disposal. On account of its high absorption coefficient for methanol, hydrogen cyanide is often co-absorbed together with the thiols in the absorption stage configured for the thiols. Hydrogen cyanide is readily soluble in methanol and water. The hydrogen cyanide is thus found predominantly in the methanol laden with co-absorbed gas components withdrawn from the stripping stage and in the methanol-water mixture withdrawn from the scrubbing stage. In order that hydrogen cyanide may be sent for proper disposal it is initially converted into a cyanide salt by addition of a base. The base may be for example methanol or aqueous sodium hydroxide solution or potassium hydroxide solution. The hydrogen cyanide is accordingly converted into sodium cyanide or potassium cyanide. These readily water-soluble compounds eventually accumulate in the water of the apparatus utilized for the thermal separation process for separating methanol and water.

One embodiment of the process according to the invention is therefore characterized in that the hydrogen cyanide is converted into a water-soluble cyanide salt by addition of the base. The water-soluble cyanide salt may then be converted in the context of a wastewater treatment for example into carbon dioxide and nitrogen by oxidation with a suitable oxidant.

One embodiment of the process according to the invention is characterized in that the addition of the base is effected in the hot regeneration stage and/or in an apparatus configured for the thermal separation process and/or between the hot regeneration stage and the apparatus configured for the thermal separation process.

One embodiment of the process according to the invention is characterized in that the gas scrubbing process comprises a plurality of absorption stages, wherein at least two further absorption stages are provided, wherein the two further absorption stages are configured for the removal of hydrogen sulfide ($H_2S$) and for the removal of carbon dioxide ($CO_2$).

The process according to the invention is to be understood as being a subprocess of a superordinate gas scrubbing process, wherein the latter is configured for removing all undesired components occurring in synthesis gas. The gas scrubbing process especially comprises at least two further absorption stages, wherein these absorption stages are configured for removing hydrogen sulfide and carbon dioxide.

It is advantageous when the absorption stage configured for the removal of thiols and the absorption stage configured for the removal of hydrogen sulfide ($H_2S$) are integrated into a common absorption column.

This allows a subamount of the methanol already utilized for absorption of hydrogen sulfide also to be utilized for absorption of the thiols in the absorption stage configured for absorption of thiols. Since the total concentration of the thiols is comparatively low it is sufficient to divert a small subamount of the methanol already laden with hydrogen sulfide for absorption of the thiols. Accordingly, the majority of the methanol utilized for absorption of hydrogen sulfide and thus laden is not utilized for absorption of the thiols but rather sent directly to a suitable regeneration which typically comprises a plurality of flash stages and the hot regeneration stage. Hydrogen sulfide co-absorbed with the thiols is either withdrawn from the stripping stage with the laden methanol as a co-absorbed component or exits the scrubbing stage together with the water-scrubbed thiols for sulfur recovery.

One embodiment of the process according to the invention is characterized in that the absorption stage configured for the removal of carbon dioxide ($CO_2$) is integrated into a separate absorption column.

It is especially preferable when the synthesis gas is initially supplied to the absorption stages configured for removal of hydrogen sulfide ($H_2S$) and thiols and optionally for removal of further sulfur-containing components, the synthesis gas freed of sulfur-containing components is subsequently sent to a water gas shift unit and the synthesis gas enriched in hydrogen and carbon dioxide by the water gas shift unit is subsequently sent to the absorption stage configured for removal of carbon dioxide ($CO_2$).

Especially for the production of hydrogen from synthesis gas the synthesis gas is subjected to a water gas shift reaction in order to react carbon monoxide present in the synthesis gas with water to afford hydrogen and carbon dioxide. The catalyst used for the water gas shift reaction may be poisoned and ultimately deactivated by sulfur compounds. It is therefore advantageous to initially remove all sulfur compounds from the as yet unshifted synthesis gas by gas scrubbing. The sulfur-free synthesis gas is subsequently subjected to the water gas shift reaction. It therefore becomes enriched with carbon dioxide. Therefore, the total carbon dioxide amount, i.e. the carbon dioxide amount originating from the originally produced synthesis gas and the carbon dioxide amount produced by the water gas shift reaction, is then advantageously removed by an absorption stage dedicated to the removal of carbon dioxide.

One embodiment of the process according to the invention is characterized in that prior to step (b) the laden methanol obtained according to step (a) is subjected to a flash stage for removal of co-absorbed value gases, in particular of co-absorbed hydrogen and carbon monoxide.

While value gases present in synthesis gas (CO, $H_2$) have only a very low absorption coefficient for methanol as absorption medium compared to the undesired components, value gases are nevertheless co-absorbed in methanol in small amounts. The laden methanol obtained in step (a) is therefore advantageously withdrawn from the absorption stage and supplied to a flash stage and only subsequently supplied to the stripping stage according to step (b). The flash stage effects desorption of the value gases by simple pressure reduction, for example to a pressure of 10 to 25 bar. The value gases are subsequently recompressed to absorption pressure (for example 20 to 60 bar) and supplied to the synthesis gas to be treated in the gas scrubbing.

One embodiment of the process according to the invention is characterized in that the process is configured for removing thiols and further for removing carbon disulfide ($CS_2$) and thiophene from synthesis gas.

Similarly to thiols, carbon disulfide and thiophene have a high absorption coefficient for methanol as absorption medium and are therefore often co-absorbed in the absorption stage configured for absorption of thiols. Due to their similar physical properties these are likewise stripped out by methanol vapour in the stripping stage according to step (b), accumulate in the gaseous mixture with thiols and methanol and may subsequently be freed of methanol by scrubbing with water, without dissolving in water to a significant extent, in the scrubbing stage according to step (e). The process according to the invention is therefore also configured and suitable for removing carbon disulfide and thiophene from synthesis gas.

One embodiment of the process according to the invention is characterized in that the methanol vapour according to step (b) is produced by heating the methanol of the stripping stage.

Methanol vapour for use as stripping gas required in the stripping stage according to step (b) is advantageously produced directly from the methanol of the stripping stage, i.e. from the methanol laden with thiols and further co-absorbed gas components supplied to the stripping stage. This is effected for example by means of a reboiler integrated into the stripping column of the stripping stage.

The objects of the invention are further at least partially achieved by a plant for removing thiols from synthesis gas in a gas scrubbing process with methanol as physical absorption medium, in particular by the process according to the invention in one of the abovementioned embodiments, characterized by the following components in operative interconnection:

(a) an absorption column, wherein the absorption column comprises at least one absorption stage configured for removal of thiols from the synthesis gas, wherein methanol laden with thiols and further co-absorbed gas components is obtainable in the absorption stage;

(b) a stripping column, wherein the stripping column is configured for stripping the methanol laden with thiols and further co-absorbed gas components obtainable via component (a) with methanol vapour as stripping gas, wherein a thiols- and methanol-comprising gaseous mixture and liquid methanol laden with co-absorbed gas components is obtainable via the stripping column;

(c) a discharging apparatus for withdrawing the liquid methanol laden with co-absorbed gas components obtainable via component (b) from the stripping column;

(d) a discharging apparatus for withdrawing the thiols- and methanol-comprising gaseous mixture obtainable via component (b) from the stripping column;

(e) a scrubbing column for removing methanol from the thiols- and methanol-comprising gaseous mixture obtainable via component (b) by means of which a methanol- and water-comprising liquid mixture and gaseous thiols at least partially freed of methanol are obtainable;

(f) a discharging apparatus for withdrawing the gaseous thiols at least partially freed of methanol obtainable via component (e) from the scrubbing column;

(g) a discharging apparatus for withdrawing the methanol- and water-comprising liquid mixture obtainable via component (e) from the scrubbing column.

One embodiment of the plant according to the invention is characterized in that the plant comprises a cooling apparatus, wherein the cooling apparatus is configured for cooling the gaseous mixture obtainable via component (b), wherein methanol present in the mixture is partially condensible and condensed methanol is suppliable to the stripping column for producing methanol vapour for use as stripping gas.

One embodiment of the plant according to the invention is characterized in that the plant comprises an apparatus for a thermal separation process, wherein said apparatus is configured for separation of the methanol- and water-comprising mixture obtainable via component (e) into methanol and water.

One embodiment of the plant according to the invention is characterized in that the plant comprises a hot regeneration column, wherein the hot regeneration column is configured for removal of co-absorbed gas components from the liquid methanol laden with co-absorbed gas components obtainable via component (b).

One embodiment of the plant according to the invention is characterized in that the liquid methanol laden with co-absorbed gas components withdrawable via component (c) comprises hydrogen cyanide (HCN) and/or the liquid mixture comprising methanol and water withdrawable via component (g) comprises hydrogen cyanide (HCN) and the plant comprises an addition apparatus for addition of a base, wherein the abovementioned hydrogen cyanide (HCN) is convertible with the base into a cyanide salt.

One embodiment of the plant according to the invention is characterized in that the addition apparatus is configured for adding the base to the hot regeneration column or for adding the base to the apparatus for thermal separation or for adding the base to a conduit arranged between the hot regeneration column and the thermal separation apparatus.

The objects of the invention are further at least partially achieved by the use of the plant according to the invention for the removal of thiols and optionally carbon disulfide ($CS_2$) and optionally thiophene from synthesis gas.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 shows a simplified process flow diagram of a possible embodiment of an inventive process or an inventive plant.

DETAILED DESCRIPTION OF PREFERRED EMBODIMENTS

The process 100 represented by the process flow diagram is to be understood as part of a superordinate gas scrubbing process which is in principle suitable for removing all gas components present in the synthesis gas. For the sake of clarity only the features relevant to the invention are shown in FIG. 1 and/or described hereinbelow. Gas streams are represented in FIG. 1 by dashed lines while liquid streams are represented by solid lines. The flow direction of the respective streams is indicated by arrows.

Synthesis gas containing undesired gas components from a gasification unit (coal gasification, refuse gasification, biomass gasification) is supplied via conduit 1 and initially cooled to a temperature of below 0° C. in heat exchanger 45 using a stream of purified synthesis gas in conduit 3. Purified synthesis gas thus heated is discharged from the process via conduit 4.

The cooled synthesis gas is sent on via conduit 2 and for removal of hydrogen sulfide and thiols introduced into an absorption column 44 comprising two absorption stages 31 and 32. Both absorption stages are separated from one another by a chimney tray 33. Via line 7 methanol suitable for the absorption of hydrogen sulfide is introduced into the upper part of the absorption column 44, into the absorption stage 31. This may be unladen methanol or for example methanol already laden with carbon dioxide. In the example of FIG. 1 the methanol is already laden with carbon dioxide. The cryogenic methanol laden with carbon dioxide flows in countercurrent to the synthesis gas from line 2. Synthesis gas flows through the absorption column from bottom to top while the methanol from conduit 7 flows through the absorption column from top to bottom, thus absorbing hydrogen sulfide from the synthesis gas from line 2. The methanol laden with carbon dioxide and hydrogen sulfide is withdrawn from the chimney tray via conduit 30 and for regeneration thereof sent to a plurality of downstream purification stages (flash stages, reabsorbers, hot regeneration stage) not shown. A small portion of the methanol already laden with carbon dioxide is via conduit 6 introduced into the lower absorption stage 32 of the absorption column 44 and therein absorbs substantially the thiols present in the synthesis gas and optionally thiophene and carbon disulfide and to a small extent other constituents such as hydrogen cyanide, hydrogen sulfide and carbonyl sulfide, wherein the latter are to be understood as co-absorbed constituents in the context of the invention. Since the thiols have a high absorption coefficient for methanol as absorption medium the small methanol amount supplied via conduit 6 is sufficient to quantitatively absorb the thiols and optionally thiophene and carbon disulfide present in the synthesis gas only in low concentrations.

The methanol laden at least with thiols and co-absorbed gas components is via conduit 5 discharged from the absorption column 44 and via a decompression valve (not shown) introduced into a flash column 34 in which value gases (CO, $H_2$) unintentionally co-absorbed in methanol are desorbed and withdrawn via conduit 8. These are then compressed to absorption pressure and recycled to the synthesis gas to be treated in conduit 1 (not shown).

The methanol laden at least with thiols and co-absorbed gas components, as well as methanol now freed of value gases, is withdrawn from the flash column 34 via conduit 9 and introduced into the stripping column 35 via conduit 9. The stripping column 35 has in its bottom region a reboiler 42 which is operated by supplying and discharging fresh steam via the conduits 18 and 19. Via the reboiler 42 laden methanol withdrawn from the stripping column 35 via conduit 16 is heated to boiling and via conduit 17 recycled into the stripping column 35. The thus produced methanol vapours act as stripping gas in the stripping column and desorb the thiols and optionally thiophene and carbon disulfide from the laden methanol substantially quantitatively. The abovementioned constituents are obtained in the gas phase not in pure form but rather together with a not-inconsiderable amount of the methanol vapours. In the stripping column 35 the methanol vapours flow upwards through the chimney tray 36 and are inside the stripping column 35 partially condensed by the cooler 46 integrated into the upper region thereof. The cooler 46 is supplied with cooling water via feed conduit 11 and discharge conduit 12. After partial condensation methanol flows downwards and in the bottom region of the stripping column 35 may be reutilized for production of stripping gas.

The methanol freed of thiols and optionally thiophene and carbon disulfide may still comprise co-absorbed components such as carbon dioxide, hydrogen sulfide, carbonyl sulfide and hydrogen cyanide. For removal of these components the methanol is via conduit 10 withdrawn from the bottom region of the stripping column and using pump 40 and via conduit 20 supplied to a hot regeneration column (not shown).

The gas mixture obtained in the top region of the stripping column 35 comprises thiols, optionally thiophene and carbon disulfide and methanol vapours not condensed via cooler 46. This gaseous mixture is withdrawn via conduit 13 and supplied to a scrubbing column 38. The scrubbing column 38 is operated with water as scrubbing liquid, for example boiler feed water, which is supplied via conduit 14 and introduced into the scrubbing column 38. The gaseous mixture which comprises thiols and optionally thiophene and carbon disulfide and methanol vapour flows through the scrubbing column 38 from bottom to top. Water flows through the scrubbing column 38 in countercurrent from top to bottom, thus selectively absorbing, i.e. dissolving, methanol from the gaseous mixture while the abovementioned sulfur compounds are not dissolved in the water. These exit the scrubbing column 38 via conduit 15 and may subsequently be supplied for example to a sulfur recovery plant operated according to the Claus process (not shown).

The methanol-water mixture obtained in the bottom region of the scrubbing column 38 is via conduits 21 and 22 withdrawn from the scrubbing column 38 and transferred into the rectification column 39 using the pump 41. Rectification column 39 is configured for thermal separation of a methanol-water mixture into methanol and water. Rectification column 39 is provided with a reboiler 43 which heats methanol-water mixture withdrawn from the bottom region of the rectification column 39 via conduit 26 to boiling and recycles it into the rectification column via conduit 27. Rectification column 38 is also supplied via conduit 23 with methanol withdrawn from the hot regeneration column which contains only a residual loading of water. The methanol-water mixture supplied via conduit 22 may be contaminated with hydrogen cyanide at low concentrations. Rectification column 38 is therefore further provided with a unit for lye addition 37 which according to a measured hydrogen cyanide concentration (not shown) supplies aqueous sodium hydroxide solution via conduit 47 to convert the hydrogen cyanide into sodium cyanide. Water contaminated with sodium cyanide is withdrawn from the bottom region of the rectification column 39 via line 25. Since sodium cyanide is non-volatile and practically insoluble in methanol it accumulates in the bottom region of the rectification column 38, i.e. in the water, and can therefore be quantitatively discharged from the gas scrubbing circuit. In the wastewater of conduit 25 the sodium cyanide may be converted into a non-toxic form for example by treatment with a suitable oxidant.

The following simulated numerical example shows that in the context of the invention the water scrubbing results in practically no thiol losses and loss of thiophene in the gaseous mixture which exits the stripping column via conduit 13.

The simulation was performed using the software "Aspen Plus" (V9) and concerns a gas scrubbing unit operated at an absorption pressure of 33 bar, wherein 440 000 Nm$^3$/h of shifted synthesis gas are processed. The raw synthesis gas has a concentration of 5 ppmv of methanethiol, 5 ppmv of butanethiol and 5 ppmv of thiophene.

| | Compound | | |
|---|---|---|---|
| | Methanethiol | Butanethiol | Thiophene |
| Conduit 13 | 100% | 100% | 100% |
| Conduit 15 | 99% | 98% | 97% |

The amount of methanethiol, butanethiol and thiophene found in the methanol-thiol-thiophene mixture in conduit 13 was normalized to 100%. It is apparent that the water scrubbing in scrubbing column 38 results in only marginal losses of the recited compounds, so that in the mixture freed of methanol in conduit 15 the thiols and thiophene are practically completely recovered.

Embodiments of the invention are described with reference to different types of subject matter. In particular, certain embodiments are described with reference to process claims while other embodiments are described with reference to apparatus claims. However, it will be apparent to a person skilled in the art from the description hereinabove and hereinbelow that unless otherwise stated in addition to any combination of features belonging to one type of claim any combination of features relating to different types of subject matter or types of claim may also be contemplated. Features may be combined to achieve synergistic effects which go beyond simple summation of the technical features.

While the invention has been represented and described in detail in the drawing and the preceding description, such a representation and description shall be considered elucidatory or exemplary and non-limiting. The invention is not limited to the disclosed embodiments. Other variations of the disclosed embodiments may be understood and executed by those skilled in the art of the field of the claimed invention from a study of the drawing, the disclosure and the dependent claims.

LIST OF REFERENCE SYMBOLS 1 to 30, 47 Conduit
31 Hydrogen sulfide absorption stage
32 Thiol absorption stage
33 Chimney tray
34 Flash column
35 Stripping column
36 Chimney tray
37 Lye addition
38 Scrubbing column
39 Rectification column
40, 41 Pump
42, 43 Reboiler
44 Absorption column
45 Heat exchanger
46 Cooler
100 Process or plant according to the invention

What is claimed is:

1. A process for removing thiols from synthesis gas in a gas scrubbing process with methanol as physical absorption medium, comprising:
   (a) removing thiols from synthesis gas in an absorption stage configured for the removal of thiols by physical absorption of the thiols in methanol, wherein the absorption stage affords methanol laden with thiols and further co-absorbed gas components;
   (b) treating the laden methanol obtained according to step (a) in a stripping stage with methanol vapour as stripping gas to obtain a thiols- and methanol-comprising gaseous mixture and liquid methanol laden with co-absorbed gas components;
   (c) withdrawing the liquid methanol laden with co-absorbed gas components from the stripping stage according to step (b);
   (d) withdrawing the thiols- and methanol-comprising gaseous mixture from the stripping stage according to step (b);
   (e) removing methanol from the gaseous mixture withdrawn according to step (d) in a scrubbing stage by scrubbing with water to obtain a methanol- and water-comprising liquid mixture and gaseous thiols at least partially freed of methanol;
   (f) withdrawing the gaseous thiols at least partially freed of methanol from the scrubbing stage according to step (e); and
   (g) withdrawing the methanol- and water-comprising liquid mixture from the scrubbing stage according to step (e).

2. The process according to claim 1, wherein the gaseous mixture obtained according to step (b) is cooled to partially condense the methanol present in the mixture and the condensed methanol is supplied to the stripping stage to produce methanol vapour for use as stripping gas.

3. The process according to claim 1, wherein the methanol- and water-comprising liquid mixture withdrawn according to step (g) is subjected to a thermal separation process for separation of methanol and water.

4. The process according to claim 1, wherein the thiols withdrawn from the scrubbing stage according to step (f) and at least partially freed of methanol are sent to a process for sulfur recovery.

5. The process according to claim 1, wherein the methanol withdrawn from the stripping stage according to step (c) is sent to a hot regeneration stage for removal of the co-absorbed gas components.

6. The process according to claim 1, wherein the co-absorbed gas components comprise one or more elements selected from the group of hydrogen cyanide, hydrogen sulfide, carbonyl sulfide and carbon dioxide.

7. The process according to claim 1, wherein the methanol- and water-comprising mixture withdrawn from the scrubbing stage according to step (g) comprises hydrogen cyanide and/or that the liquid methanol laden with co-absorbed gas components withdrawn from step (c) comprises hydrogen cyanide and wherein the hydrogen cyanide is converted into a cyanide salt by addition of a base.

8. The process according to claim 7, wherein the addition of the base is effected in the hot regeneration stage and/or in an apparatus configured for the thermal separation process and/or between the hot regeneration stage and the apparatus configured for the thermal separation process.

9. The process according to claim 1, wherein the gas scrubbing process comprises a plurality of absorption stages, wherein at least two further absorption stages are provided, wherein the two further absorption stages are configured for the removal of hydrogen sulfide and for the removal of carbon dioxide.

10. The process according to claim 9, wherein the absorption stage configured for the removal of thiols and the absorption stage configured for the removal of hydrogen sulfide are integrated into a common absorption column.

11. The process according to claim 9, wherein the absorption stage configured for the removal of carbon dioxide is integrated into a separate absorption column.

12. The process according to claim 9, wherein the synthesis gas is initially supplied to the absorption stages configured for removal of hydrogen sulfide and thiols, the synthesis gas freed of sulfur-containing components is subsequently sent to a water gas shift unit and the synthesis gas enriched in hydrogen and carbon dioxide by the water gas shift unit is subsequently sent to the absorption stage configured for removal of carbon dioxide.

13. The process according to claim 1, wherein prior to step (b) the laden methanol obtained according to step (a) is subjected to a flash stage for removal of co-absorbed value gases.

14. The process according to claim 1, wherein the process is configured for removing thiols and further for removing carbon disulfide and thiophene from synthesis gas.

15. The process according to claim 1, wherein the methanol vapour according to step (b) is produced by heating the methanol of the stripping stage.

16. A plant for removing thiols from synthesis gas in a gas scrubbing process with methanol as physical absorption medium by the process according to claim 1, wherein the following components in operative interconnection:

(a) an absorption column, wherein the absorption column comprises at least one absorption stage configured for removal of thiols from the synthesis gas, wherein methanol laden with thiols and further co-absorbed gas components is obtainable in the absorption stage;

(b) a stripping column, wherein the stripping column is configured for stripping the methanol laden with thiols and further co-absorbed gas components obtainable via component (a) with methanol vapour as stripping gas, wherein a thiols- and methanol-comprising gaseous mixture and liquid methanol laden with co-absorbed gas components is obtainable via the stripping column;

(c) a discharging apparatus for withdrawing the liquid methanol laden with co-absorbed gas components obtainable via component (b) from the stripping column;

(d) a discharging apparatus for withdrawing the thiols- and methanol-comprising gaseous mixture obtainable via component (b) from the stripping column;

(e) a scrubbing column for removing methanol from the thiols- and methanol-comprising gaseous mixture obtainable via component (b) by means of which a methanol- and water-comprising liquid mixture and gaseous thiols at least partially freed of methanol are obtainable;

(f) a discharging apparatus for withdrawing the gaseous thiols at least partially freed of methanol obtainable via component (e) from the scrubbing column; and (g) a discharging apparatus for withdrawing the methanol- and water-comprising liquid mixture obtainable via component (e) from the scrubbing column.

17. The plant according to claim 16, further comprising a cooling apparatus, wherein the cooling apparatus is configured for cooling the gaseous mixture obtainable via component (b), wherein methanol present in the mixture is partially condensible and condensed methanol is suppliable to the stripping column for producing methanol vapour for use as stripping gas.

18. The plant according to claim 16, further comprising an apparatus for a thermal separation process, wherein said apparatus is configured for separation of the methanol- and water-comprising mixture obtainable via component (e) into methanol and water.

19. The plant according to claim 16, further comprising a hot regeneration column, wherein the hot regeneration column is configured for removal of co-absorbed gas components from the liquid methanol laden with co-absorbed gas components obtainable via component (b).

20. The plant according to claim 16, wherein the liquid methanol laden with co-absorbed gas components withdrawable via component (c) comprises hydrogen cyanide and/or the liquid mixture comprising methanol and water withdrawable via component (g) comprises hydrogen cyanide and the plant comprises an addition apparatus for addition of a base, wherein the abovementioned hydrogen cyanide is convertible with the base into a cyanide salt.

* * * * *